US011106744B2

(12) United States Patent
Shriber et al.

(10) Patent No.: US 11,106,744 B2
(45) Date of Patent: Aug. 31, 2021

(54) SEARCH ENGINE

(71) Applicant: NEWSPLUG, INC., New York, NY (US)

(72) Inventors: John S. Shriber, New York, NY (US); Roman Zaks, New York, NY (US)

(73) Assignee: NEWSPLUG, INC., New York, NY (US)

( * ) Notice: Subject to any disclaimer, the term of this patent is extended or adjusted under 35 U.S.C. 154(b) by 179 days.

(21) Appl. No.: 16/247,361

(22) Filed: Jan. 14, 2019

(65) Prior Publication Data

US 2019/0146959 A1 May 16, 2019

Related U.S. Application Data

(63) Continuation of application No. 15/142,479, filed on Apr. 29, 2016, now Pat. No. 10,180,952, which is a
(Continued)

(51) Int. Cl.
*G06F 7/00* (2006.01)
*G06F 16/951* (2019.01)
(Continued)

(52) U.S. Cl.
CPC .......... *G06F 16/951* (2019.01); *G06F 3/0482* (2013.01); *G06F 3/04842* (2013.01); *G06F 16/22* (2019.01); *G06F 16/248* (2019.01); *G06F 16/24578* (2019.01); *G06F 16/9535* (2019.01); *G06F 40/35* (2020.01); *G06Q 10/10* (2013.01); *H04L 67/02* (2013.01); *H04L 67/10* (2013.01)

(58) Field of Classification Search
CPC ...... G06F 16/22; G06F 16/248; G06F 16/951; G06F 16/9535; G06F 16/24578
See application file for complete search history.

(56) References Cited

U.S. PATENT DOCUMENTS 6,199,081 B1 3/2001 Meyerzon et al.
6,718,365 B1 4/2004 Dutta
(Continued)

OTHER PUBLICATIONS

Search Engine, U.S. Appl. No. 13/420,503, filed Mar. 14, 2012, John Shriber, et al, U.S. Pat. No. 9,338,215, May 10, 2016.
(Continued)

*Primary Examiner* — Mohammed R Uddin
(74) *Attorney, Agent, or Firm* — Greenberg Traurig

(57) ABSTRACT

A search engine to index web content with user content. A server computer receives, from a first client computer operated by a first user, an identification of first web content displayed by a web browser of the first client computer in a main browser window. The identification of the first web content is transmitted by the first user to the server computer via a user interface separate from the main browser window. The server computer then indexes the first web content. In response to receiving a search query from a web browser of a second client computer operated by a second user, the server computer transmits search results to the web browser of the second client computer. The search results include the first web content identified by the first user in a position relative to identifications of other web content received from other users.

20 Claims, 17 Drawing Sheets

Related U.S. Application Data continuation of application No. 13/420,503, filed on Mar. 14, 2012, now Pat. No. 9,338,215.

(60) Provisional application No. 61/452,595, filed on Mar. 14, 2011.

(51) Int. Cl.

| | | |
|---|---|---|
| *G06Q 10/10* | (2012.01) | |
| *G06F 16/22* | (2019.01) | |
| *G06F 16/248* | (2019.01) | |
| *G06F 16/9535* | (2019.01) | |
| *G06F 16/2457* | (2019.01) | |
| *G06F 40/35* | (2020.01) | |
| *G06F 3/0482* | (2013.01) | |
| *G06F 3/0484* | (2013.01) | |
| *H04L 29/08* | (2006.01) | |

(56) References Cited

U.S. PATENT DOCUMENTS

| | | | |
|---|---|---|---|
| 6,807,558 B1 | 10/2004 | Hassett et al. | |
| 7,117,432 B1* | 10/2006 | Shanahan | G06F 16/353 |
| | | | 715/210 |
| 7,174,346 B1* | 2/2007 | Gharachorloo | G06F 16/951 |
| 7,216,290 B2* | 5/2007 | Goldstein | G06F 16/9577 |
| | | | 715/234 |
| 7,613,769 B1 | 11/2009 | Hess | |
| 7,617,190 B2 | 11/2009 | Wright et al. | |
| 7,634,535 B2 | 12/2009 | Watson | |
| 7,640,184 B1 | 12/2009 | Lunt | |
| 7,669,123 B2 | 2/2010 | Zuckerberg et al. | |
| 7,685,209 B1* | 3/2010 | Norton | G06F 16/907 |
| | | | 707/803 |
| 7,734,610 B2* | 6/2010 | Rakowski | G06F 16/951 |
| | | | 707/706 |
| 7,801,885 B1* | 9/2010 | Verma | G06F 16/9535 |
| | | | 707/713 |
| 7,957,723 B2 | 6/2011 | Punaganti Venkata et al. | |
| 7,958,115 B2* | 6/2011 | Kraft | G06Q 10/10 |
| | | | 707/723 |
| 7,971,147 B2 | 6/2011 | Subbarao et al. | |
| 7,984,056 B1 | 7/2011 | Kane | |
| 8,020,106 B2 | 9/2011 | Diab et al. | |
| 8,037,093 B2 | 10/2011 | Tiu, Jr. et al. | |
| 8,082,242 B1* | 12/2011 | Mysen | G06F 16/9562 |
| | | | 707/711 |
| 8,082,288 B1 | 12/2011 | Yeh et al. | |
| 8,176,055 B1* | 5/2012 | Datar | G06Q 10/10 |
| | | | 707/749 |
| 8,190,997 B2 | 5/2012 | Shellen et al. | |
| 8,276,079 B2 | 9/2012 | Davar et al. | |
| 8,290,926 B2 | 10/2012 | Ozzie et al. | |
| 8,374,975 B1* | 2/2013 | Cierniak | G06F 16/355 |
| | | | 706/12 |
| 8,386,915 B2 | 2/2013 | Howes et al. | |
| 8,578,261 B1* | 11/2013 | Gupta | G06F 16/957 |
| | | | 715/208 |
| 8,589,391 B1* | 11/2013 | Reynar | G06Q 30/02 |
| | | | 707/732 |
| 8,589,418 B1 | 11/2013 | Kane | |
| 8,601,055 B2 | 12/2013 | Smith et al. | |
| 8,606,845 B2 | 12/2013 | Dickinson et al. | |
| 8,667,385 B1 | 3/2014 | Mui et al. | |
| 8,832,083 B1* | 9/2014 | Chen | G06F 16/951 |
| | | | 707/723 |
| 8,874,541 B1 | 10/2014 | Vandehey et al. | |
| 8,874,591 B2* | 10/2014 | Dai | G06F 16/9535 |
| | | | 707/751 |
| 8,996,625 B1* | 3/2015 | Singleton | H04L 29/06 |
| | | | 709/206 |
| 9,058,391 B2 | 6/2015 | Shriber et al. | |
| 9,338,215 B2 | 5/2016 | Shriber et al. | |
| 9,645,700 B2 | 5/2017 | Tsai | |
| 9,740,794 B2 | 8/2017 | Bhumkar et al. | |
| 9,977,800 B2 | 5/2018 | Shriber et al. | |
| 10,180,952 B2 | 1/2019 | Shriber et al. | |
| 10,387,391 B2 | 8/2019 | Shriber et al. | |
| 2002/0046203 A1* | 4/2002 | Siegel | G06F 16/9535 |
| 2002/0194611 A1* | 12/2002 | Hodgkinson | H04N 21/4221 |
| | | | 725/109 |
| 2003/0233422 A1 | 12/2003 | Csaszar et al. | |
| 2004/0019611 A1* | 1/2004 | Pearse | G06F 16/9566 |
| 2004/0030697 A1 | 2/2004 | Cochran et al. | |
| 2004/0249800 A1* | 12/2004 | Lu | G06F 16/951 |
| 2005/0165615 A1 | 7/2005 | Minar | |
| 2005/0216457 A1* | 9/2005 | Walther | G06F 16/9558 |
| 2005/0257128 A1 | 11/2005 | Pasquali et al. | |
| 2005/0267973 A1 | 12/2005 | Carlson et al. | |
| 2005/0289468 A1 | 12/2005 | Kahn et al. | |
| 2006/0073812 A1 | 4/2006 | Punaganti Venkata et al. | |
| 2006/0095507 A1 | 5/2006 | Watson | |
| 2006/0167860 A1 | 7/2006 | Eliashberg et al. | |
| 2006/0173985 A1 | 8/2006 | Moore | |
| 2006/0184617 A1 | 8/2006 | Nicholas et al. | |
| 2006/0190616 A1 | 8/2006 | Mayerhofer et al. | |
| 2006/0217126 A1 | 9/2006 | Sohm et al. | |
| 2006/0230021 A1 | 10/2006 | Diab et al. | |
| 2006/0230061 A1 | 10/2006 | Sample et al. | |
| 2006/0253458 A1* | 11/2006 | Dixon | G06Q 30/02 |
| 2007/0033517 A1 | 2/2007 | O'shaughnessy et al. | |
| 2007/0043617 A1 | 2/2007 | Stein et al. | |
| 2007/0083520 A1 | 4/2007 | Shellen et al. | |
| 2007/0083536 A1 | 4/2007 | Darnell et al. | |
| 2007/0118794 A1 | 5/2007 | Hollander et al. | |
| 2007/0156636 A1* | 7/2007 | Norton | G06F 16/907 |
| 2007/0156809 A1 | 7/2007 | Dickinson et al. | |
| 2007/0174389 A1 | 7/2007 | Armstrong et al. | |
| 2007/0192313 A1* | 8/2007 | Finley | G06F 16/9535 |
| 2007/0198526 A1 | 8/2007 | Pitkow | |
| 2007/0203887 A1* | 8/2007 | Dynin | G06F 16/9535 |
| 2007/0225047 A1 | 9/2007 | Bakos | |
| 2007/0266338 A1* | 11/2007 | Shirai | G06F 16/957 |
| | | | 715/808 |
| 2007/0271246 A1* | 11/2007 | Repasi | G06F 16/951 |
| 2008/0005761 A1* | 1/2008 | Repasi | H04H 60/66 |
| | | | 725/13 |
| 2008/0021880 A1 | 1/2008 | Ren et al. | |
| 2008/0028181 A1 | 1/2008 | Tong et al. | |
| 2008/0059444 A1* | 3/2008 | Singh | G06F 16/2272 |
| 2008/0059453 A1* | 3/2008 | Laderman | G06F 16/3326 |
| 2008/0065649 A1* | 3/2008 | Smiler | G06F 16/972 |
| 2008/0071929 A1* | 3/2008 | Motte | H04L 67/02 |
| | | | 709/246 |
| 2008/0082904 A1* | 4/2008 | Martinez | G06Q 30/02 |
| | | | 715/205 |
| 2008/0114861 A1 | 5/2008 | Gildred | |
| 2008/0126476 A1 | 5/2008 | Nicholas et al. | |
| 2008/0215589 A1 | 9/2008 | Elhaik | |
| 2008/0235594 A1 | 9/2008 | Bhumkar et al. | |
| 2008/0256443 A1 | 10/2008 | Li et al. | |
| 2008/0281810 A1* | 11/2008 | Smyth | G06F 16/951 |
| 2008/0294632 A1 | 11/2008 | Chang et al. | |
| 2008/0313215 A1 | 12/2008 | Beker et al. | |
| 2009/0132949 A1 | 5/2009 | Bosarge | |
| 2009/0144272 A1 | 6/2009 | Adarsh et al. | |
| 2009/0157490 A1* | 6/2009 | Lawyer | G06F 16/23 |
| | | | 705/59 |
| 2009/0164446 A1* | 6/2009 | Holt | G06F 16/3326 |
| 2009/0217196 A1* | 8/2009 | Neff | G06F 16/9535 |
| | | | 715/799 |
| 2009/0271388 A1* | 10/2009 | Murdock | G06F 16/748 |
| 2009/0299824 A1* | 12/2009 | Barnes, Jr. | G06Q 30/0207 |
| | | | 705/7.39 |
| 2010/0011282 A1 | 1/2010 | Dollard et al. | |
| 2010/0023506 A1 | 1/2010 | Sahni et al. | |
| 2010/0057677 A1* | 3/2010 | Rapp | G06F 16/25 |
| | | | 707/E17.014 |
| 2010/0088170 A1 | 4/2010 | Glore, Jr. | |
| 2010/0125541 A1 | 5/2010 | Wendel et al. | |
| 2010/0199340 A1 | 8/2010 | Jonas et al. | |

(56) References Cited

U.S. PATENT DOCUMENTS

| | | | |
|---|---|---|---|
| 2010/0257184 A1* | 10/2010 | Uy | G06F 16/951 707/748 |
| 2010/0262597 A1 | 10/2010 | Han | |
| 2010/0280860 A1* | 11/2010 | Iskold | G06Q 50/01 705/319 |
| 2010/0299326 A1* | 11/2010 | Germaise | G06F 16/9535 707/728 |
| 2010/0306249 A1* | 12/2010 | Hill | G06Q 50/01 707/769 |
| 2010/0312771 A1 | 12/2010 | Richardson et al. | |
| 2010/0313252 A1 | 12/2010 | Trouw | |
| 2011/0040787 A1* | 2/2011 | Cierniak | G06F 16/22 707/770 |
| 2011/0043652 A1 | 2/2011 | King et al. | |
| 2011/0087649 A1* | 4/2011 | Sarukkai | G06F 16/735 707/710 |
| 2011/0161413 A1* | 6/2011 | Cierniak | G06F 16/958 709/203 |
| 2011/0179020 A1 | 7/2011 | Ozzie et al. | |
| 2011/0184960 A1* | 7/2011 | Delpha | G06F 40/169 707/754 |
| 2011/0208822 A1* | 8/2011 | Rathod | G06F 16/9535 709/206 |
| 2011/0213655 A1* | 9/2011 | Henkin | G06Q 30/0251 705/14.49 |
| 2011/0238508 A1 | 9/2011 | Koningstein | |
| 2011/0252041 A1* | 10/2011 | Broman | G06F 16/313 707/748 |
| 2011/0258526 A1* | 10/2011 | Supakkul | G06F 40/169 715/230 |
| 2012/0102048 A1 | 4/2012 | Heer | |
| 2012/0158753 A1 | 6/2012 | He et al. | |
| 2012/0159635 A1 | 6/2012 | He et al. | |
| 2012/0166284 A1* | 6/2012 | Tseng | G06Q 30/0273 705/14.58 |
| 2012/0166453 A1 | 6/2012 | Broder | |
| 2012/0239639 A1 | 9/2012 | Shriber et al. | |
| 2012/0240030 A1 | 9/2012 | Shriber et al. | |
| 2012/0240053 A1 | 9/2012 | Shriber et al. | |
| 2013/0066710 A1* | 3/2013 | Zimak | G06Q 30/0241 705/14.43 |
| 2013/0132814 A1 | 5/2013 | Mangini et al. | |
| 2015/0169749 A1* | 6/2015 | Camelo | G06F 16/951 707/706 |
| 2015/0256591 A1 | 9/2015 | Shriber et al. | |
| 2015/0370417 A9 | 12/2015 | Tsai | |
| 2016/0239526 A1 | 8/2016 | Shriber et al. | |
| 2018/0268006 A1 | 9/2018 | Shriber et al. | |
| 2019/0332589 A1 | 10/2019 | Shriber et al. | |

OTHER PUBLICATIONS

Systems and Methods for Enabling a User to Operate on Displayed Web Content via a Web Browser Plug-in, U.S. Appl. No. 13/420,507, filed Mar. 14, 2012, John Shriber, et al, U.S. Pat. No. 9,977,800, May 22, 2018.

System and Method for Transmitting a Feed Related to a First User to a Second User, U.S. Appl. No. 13/420,508, filed Mar. 14, 2012, John Shriber, et al, U.S. Pat. No. 9,058,391, Jun. 16, 2015.

System and Method for Transmitting Submissions Associated with Web Content, U.S. Appl. No. 14/717,984, filed May 20, 2015, John Shriber, et al, Allowed—Notice of Allowance Not Yet Mailed, dated Mar. 23, 2019.

Search Engine, U.S. Appl. No. 15/142,479, filed Apr. 29, 2016, John Shriber, et al, U.S. Pat. No. 1,018,0952, Jan. 15, 2019.

Systems and Methods for Enabling a User to Operate on Displayed Web Content via a Web Browser Plug-in, U.S. Appl. No. 15/984,163, filed May 18, 2018, John Shriber, et al, Docketed New Case—Ready for Examination, Jun. 21, 2018.

System and Method for Transmitting Submissions Associated with Web Content, U.S. Appl. No. 16/509,425, John Shriber, et al, Application Undergoing Preexam Processing, Jul. 11, 2019.

* cited by examiner

Fig. 3D

Fig. 4B roommate search service, roommate finder, roommates wanted - Internet Explorer, opimized for Bing and MSN — 440

BBC http://www.roomster.com/ | roommate search service, ro....

SW ..Roomster.com 0 comments  0 likes  0 dislikes

1st

Roomster ← 410
Roomster - the best service since
features & largest community on
Shares, Apartments & Sublets.
A
every minute!

Check out our blog!
sign up for a free account
or sign in

Post your vacancies for free
Are you an apartment manager,
broker, owner or sub-lessor?
Post your rentals for Free.
Add, Edit or Delete them with
24hr access
Sign up for a free account or
sign in

SLANGWHO

@roomster.com

Welcome to Roomster Reviews. Find ← 445
reviews, comments, and updates about
Roomster and Roommates. We are the
world's largest online social network, the
largest community ← 425 http://www.roomster.com/

☐ Anonymize  👍Like  👎Dislike  =Neutral  ☑Share

| # | syria |
| # | suicide |
| # | attack |
| # | kills |
| # | bombings | roommate search service, roommate finder, roommates wanted - Internet Explorer, opimized for Bing and MSN BBC http://www.roomster.com/

SW Roomster.com    roommate search service, ro... X 1 comments    1 likes   0 dislikes    1st

Roomster
Roomster - the best service since features & largest community on Shares, Apartments & Sublets.
A every minute!

Check out our blog!
sign up for a free account or sign in

Post your vacancies for free
Are you an apartment manager, broker, owner or sub-lessor?
Post your rentals for Free.
Add, Edit or Delete them with 24hr access
Sign up for a free account or sign in

SLANGWHO

@roomster.com
Welcome to Roomster Reviews. Find reviews, comments, and updates about Roomster and Roommates. We are the world's largest online social network, the largest community
http://www.roomster.com/ — 445
— 425

1 comment                  1 like  0 dislikes

Wan Di        awesome! i cannot
Dec 19, 12:45 AM   believe it i love it — 455
              sooooo much 👍 Like  👎 Dislike  = Neutral  ✉ Share ADDED TO S
SLANGWHO SEARCH:
syria
suicide
attack
kills
bombings

Roomster

Roomster - the best service since features & largest community on Shares, Apartments & Sublets. A every minute!

Check out our blog! sign up for a free account or sign in

Post your vacancies for free
Are you an apartment manager, broker, owner or sub-lessor?
Post your rentals for Free.
Add, Edit or Delete them with 24hr access
Sign up for a free account or sign in

SLANGWHO

@roomster.com
Welcome to Roomster Reviews. Find reviews, comments, and updates about Roomster and Roommates. We are the world's largest online social network, the largest community
http://www.roomster.com/

1 like   1 dislikes

Wan Di
Dec 19, 12:45 AM
awesome!, i cannot believe it i love it sooooo much

John Shriber
Dec 20, 9:34 PM
this is really too bad

Like  Dislike  =Neutral  Share

ADDED TO S
SLANGWHO SEARCH:

syria
suicide
attack
kills
bombings 2 comments  1 likes  1 dislikes

Fig. 4F

SEARCH ENGINE

RELATED APPLICATIONS

This application is a continuation of U.S. patent application Ser. No. 15/142,479, filed on Apr. 29, 2016 and entitled "Search Engine", which is a continuation of, and claims priority to, U.S. patent application Ser. No. 13/420,503, filed on Mar. 14, 2012 and entitled "Search Engine", which issued on May 10, 2016 as U.S. Pat. No. 9,338,215, which claims the benefit of U.S. Provisional Application Ser. No. 61/452,595, filed Mar. 14, 2011, the entire disclosure of which applications are incorporated herein by reference.

FIELD

The present disclosure relates to web content, and more specifically to a search engine.

BACKGROUND

Web content accessible via the Internet includes web pages, videos, photographs, blogs, news, media, songs, etc. Searching the web for web content is performed by search engines. Search engines, such as GOOGLE® and BING®, typically use bots or web crawlers to follow links in web pages to discover content, index the content, and then sort the indexed content through an algorithm.

SUMMARY

The process employed by typical search engines to generate search results may not accurately reflect the interest of users on the web. A conventional search engine follows links in web pages to locate web content, indexes the content, and then sorts the indexed content through a complex algorithm which may indirectly take into account the interest of the web users.

In one aspect, a server computer receives, from a first client computer operated by a first user, an identification of first web content displayed by a web browser of the first client computer in a main browser window. The identification of the first web content is transmitted by the first user to the server computer via a user interface separate from the main browser window. The server computer then indexes the first web content. In response to receiving a search query from a web browser of a second client computer operated by a second user, the server computer transmits search results to the web browser of the second client computer. The search results include the first web content identified by the first user in a position relative to identifications of other web content received from other users.

In one embodiment, the receiving of the identification of first web content includes receiving, by the server computer, a rating (e.g., a score or an indication of like, dislike, or neutral) associated with the first web content from the first user. In one embodiment, the receiving of the identification of first web content further includes receiving ratings associated with the other web content from the other users. In one embodiment, the server computer ranks the first web content from the rating in relation to the ratings of the other web content received from the other users. In one embodiment, the indexing of the first web content includes receiving keywords for the first web content. In one embodiment, the receiving of the identification of the first web content further includes receiving, by the server computer from the first client computer, a comment on the first web content. The first web content can be the same as or different than the other web content.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIGS. 3A-3F are exemplary screen shots of a user interface and a plug-in module when a web page is added to the server computer via the plug-in module in accordance with an embodiment of the present disclosure;

FIGS. 4A-4F are exemplary screen shots of the user interface and the plug-in module when a web site is added to the server computer via the plug-in module in accordance with an embodiment of the present disclosure.

DESCRIPTION OF EMBODIMENTS

Figure 1A:
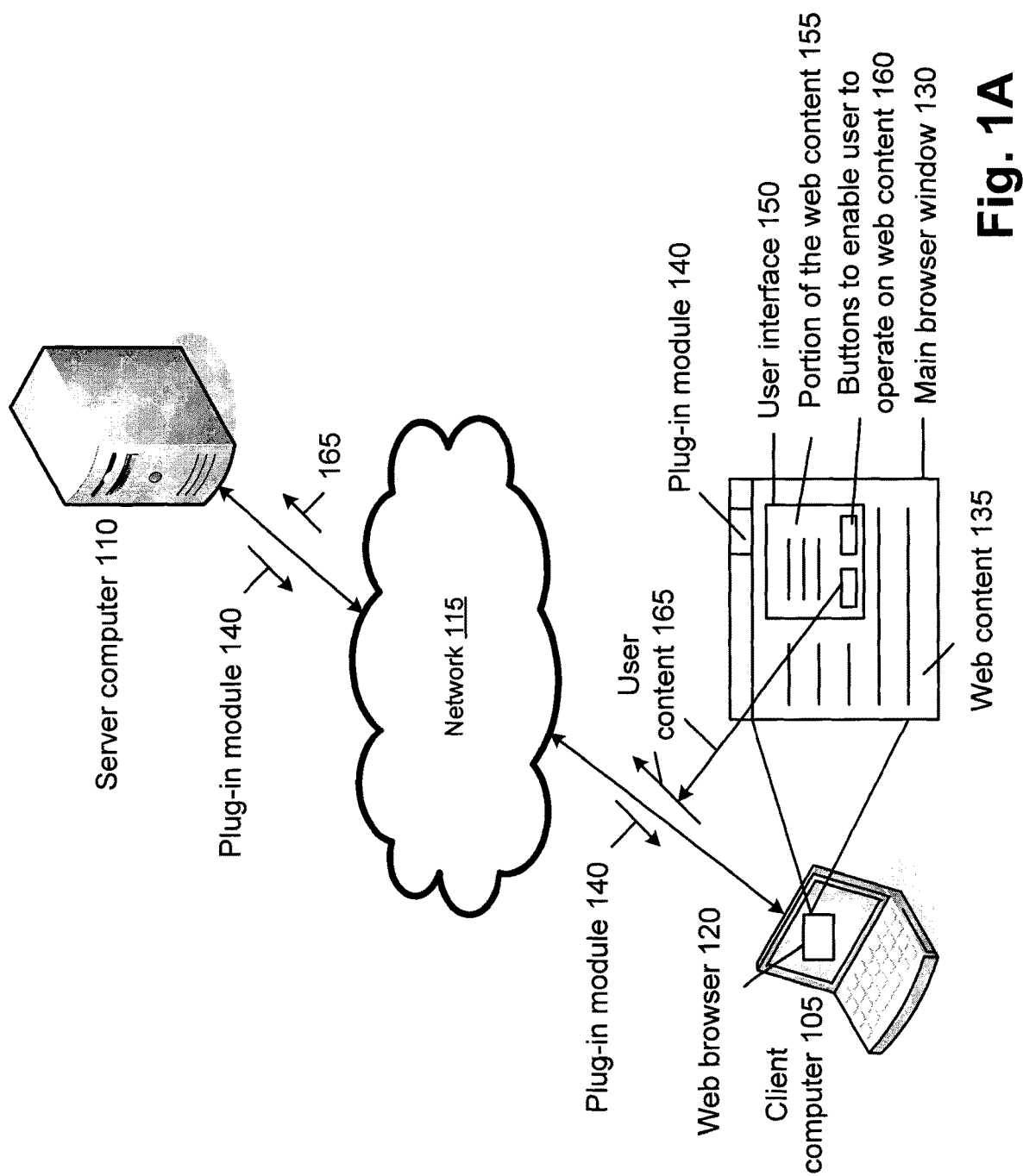
FIG. 1A is a block diagram of a client computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. Fore example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1A is a block diagram of an embodiment of a client computer 105 communicating with a server computer 110 over a network 115 such as the Internet. A user uses a web browser 120 on the client computer 105 to access the Internet. In one embodiment, a web page is transmitted via the network 115 to the client computer 105 for display by the web browser 120 in a main browser window 130. The web browser 120 displays web content 135 in the main window 130 of the web browser 120. The web content 135 is generally received from a third party server different from the server computer 110 without going through the server computer 110. The third party server is generally independent from the server computer 110; and the presentation of the web content from the third party server to the web browser 120 is made without a reference to the server computer 110. However, the techniques described herein also apply to the scenario in which the web content 135 is from the server computer 110.

In one embodiment, the client computer 105 submits a request to the server computer 110 (e.g., via the web content 135) for a plug-in module 140. The plug-in module 140 may be associated with the web content 135, may be associated with another web page, and/or may be associated with a displayed advertisement. The server computer 110 transmits the plug-in module 140 to the browser 120 (to install the plug-in module 140 on the browser 120). In one embodiment, the plug-in module 140 is installed on the browser to present a user interface element such as a button on a toolbar of the web browser 120 (e.g., the browser toolbar or a third party toolbar) or a menu item in the browser 120, etc.

The user of the client computer 105 can activate the plug-in module 140 by, for example, selecting the button for the plug-in module 140 (e.g., via a mouse cursor, touching the button, speaking a command, etc.). In one embodiment, upon activation, the plug-in module 140 causes the web browser 120 to display a user interface 150 separate from the main browser window 130 (e.g., a pop-up window). In one embodiment, the user interface 150 displays at least a portion of the web content 155 to the user and enables the user to operate on the displayed web content 155 (and, e.g., generate user content associated with the web content 135, such as a rating, comment, etc. as described below). In one embodiment, the user interface 150 includes one or more buttons 160 to enable the user to operate on the portion of the web content 155. In one embodiment, the plug-in module 140 transmits user content 165 to the server computer 110 (e.g., for indexing).

For purposes of this disclosure, a computer such as the client computer 105 includes a processor and memory for storing and executing program code, data and software. Computers can be provided with operating systems that allow the execution of software applications in order to manipulate data. Client computer 105 can be any device that can display a website and that can be used by a user. Personal computers, servers, personal digital assistants (PDAs), wireless devices, smartphones, cellular telephones, tablet computers, internet appliances, media players, home theater systems, and media centers are several non-limiting examples of computers.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A number of program modules and data files can be stored on a computer readable medium of the server. They can include an operating system suitable for controlling the operation of a networked server computer, such as the WINDOWS 7, WINDOWS VISTA, or WINDOWS XP operating system published by Microsoft Corporation of Redmond, Wash., or the Ubuntu operating system distributed by Canonical Ltd. of Douglas, Isle of Man.

In one embodiment, the server computer 110 is a group of servers, such as one server to receive the submitted user content transmitted from the plug-in module 140 and a second server configured to download/install the plug-in module 140 into the user's web browser 120. In another embodiment, server computer 110 performs both of these functions. In one embodiment, a third server may be present in FIG. 1A representing a third party web server on the Internet (e.g., an online newspaper site, a blog, etc.) that is separate and distinct from server computer 110.

Figure 1B:
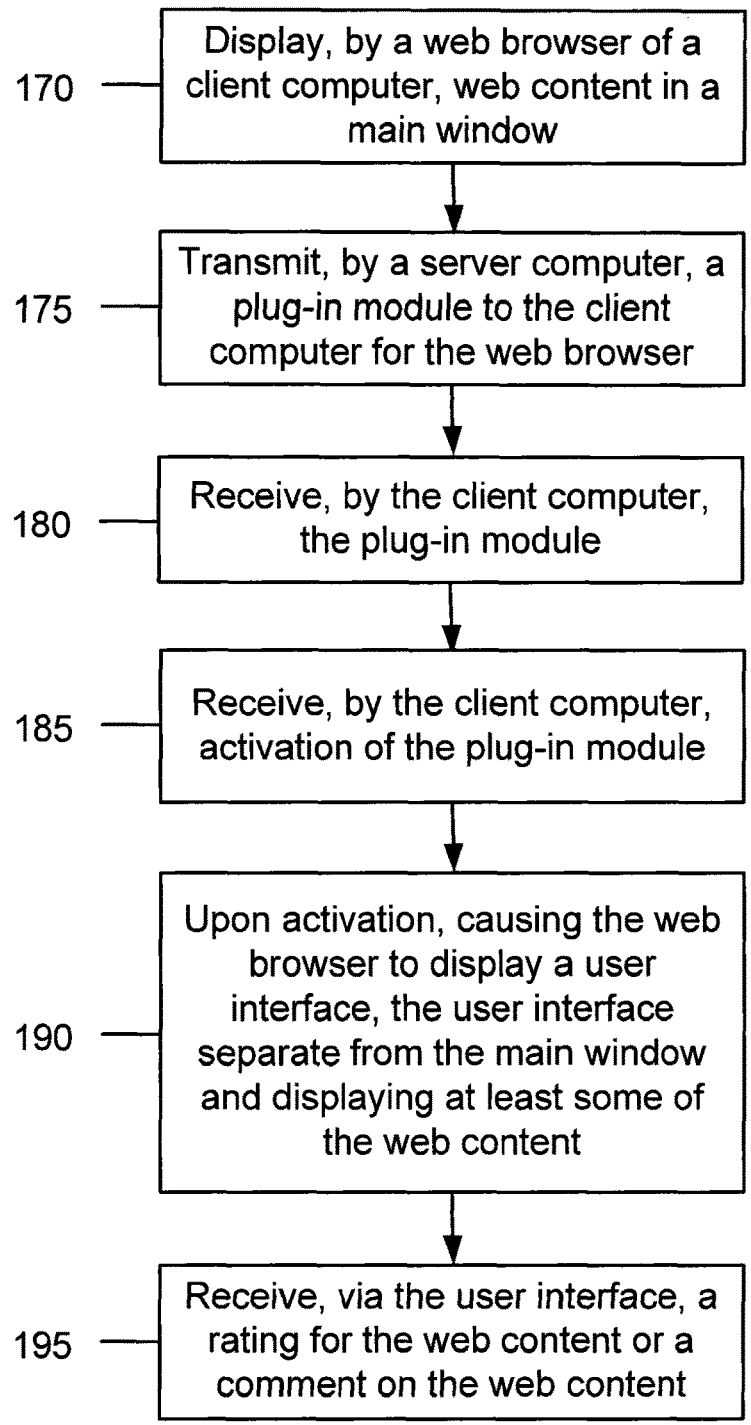
FIG. 1B is a flowchart illustrating operations performed by the server computer and the client computer to enable a user of the client computer to operate on web content displayed by the client computer in accordance with an embodiment of the present disclosure.

FIG. 1B is a flowchart illustrating an embodiment of operations performed by the server computer 110 and the client computer 105 to enable a user of the client computer 105 to operate on web content displayed by the browser 120. The user uses the web browser 120 to view and/or listen to web content 135, such as a web page, an audio file, a video, a post, a media file, etc., in main browser window 130 (Operation 170). In one embodiment, the plug-in module 140 is installed prior to and independent from the web content 135; the installation of the plug-in module 140 and its operation requires no prior arrangement made in the web content 135; and thus, the plug-in module 140 can work with any web content 135 found in the web. Alternatively, the web content 135 (e.g., a web page associated with the server computer 110) enables the user to install plug-in module 140. In another embodiment, the web content 135 (e.g., a web page) is a third party web page that includes an advertisement to install the plug-in module 140.

The server computer 110 transmits the plug-in module 140 to the web browser 120 of the client computer 105 (Operation 175) and the client computer 105 receives the plug-in module 140 (Operation 180). In one embodiment, the plug-in module 140 allows the user to remotely log into the server computer 110. Upon activation of the plug-in module 140 (Operation 185), the plug-in module 140 causes the web browser 120 to display user interface 150 separate from the main window 130. In one embodiment, the user interface 150 displays at least a portion of the web content 155 that the web browser 120 is displaying in its main window 130 (Operation 190). For example, the user interface 150 can display representative information of the web content 135, such as a picture, an icon, a sentence, and/or a paragraph in the portion of the web content 155. In one embodiment, the user interface 150 displays notifications, comments, or reviews from other users who have downloaded the plug-in module 140.

In one embodiment, the user interface 150 automatically selects for display the portion of the web content 155 from the received web content 135. Further, in one embodiment the user of the client computer 105 can provide settings as to what the user interface 150 will display when web content 135 is displayed in the web browser 120 (e.g., display the first few sentences of the web content 135, display the first graphic and first few sentences of web content 135, display the entire web content 135 (e.g., a web page), etc.)

The plug-in module 140 enables the user to operate on the web content 155. For example, the user can submit a rating for the web content 155 or a comment on the web content 155 (Operation 195) (e.g., user content 165). In one embodiment, the user interface 150 enables the user to post the portion of the web content 155 to a social networking site (e.g., FACEBOOK®). In one embodiment, the user interface 150 displays current discussions related to the web content 155 and enables the user to add the web content 135 to a search engine associated with the server computer 110. In one embodiment, the user can use the user interface 150 to adjust (e.g., add web content to or remove web content from) the portion of the web content 155 displayed by the user interface 150. For example, the plug-in module 140 can transmit the URL of the web content 135 to the server computer 110. The server computer 110 can update what is displayed by or the amount of web content 155 displayed by the user interface 150. In one embodiment, the plug-in module 140 prompts the user to add the web content 135 (e.g., a web page) to the server computer's index so that the web content 135 (e.g., a web page) will be present in future search results. The plug-in module 140 may transmit the URL of the web content 135 (e.g., a web page) to the server computer 110 (which can then extract the web content 135), may transmit the entire web content 135 (e.g., a web page) to the server computer 110, or may transmit a portion of the web content 135 (e.g., a web page) to the server computer 110. In one embodiment, the server computer 110 (or the plug-in module 140) grabs the web page's meta-tags, thumbnail, title, and/or text of the web content 135 (e.g., a web page). In one embodiment, the plug-in module 140 allows the user to add web content 135 (e.g., a web page) to the server computer 110, such as via the user interface 150, a pop-up window, a menu option, right-clicking the webpage itself, via the browser 120, etc. In one embodiment, the plug-in module 140 enables the user to change the web content's tags in case the meta-tags are inaccurate.

Thus, the user interface 150 enables the user to provide information/content about a third party web content 135 (e.g., a web page) to a web page associated with the plug-in module 140 (and server computer 110) while the third party web content 135 (e.g., a web page) is displayed in web browser 120. This information/user content 165 can include one or more comments, tips, a rating for the web content 155 (e.g., a score for the web content 155), an indication that the user likes or dislikes the web content 155, a recommendation for or on the web content 155, and/or a tag for the web content 155. Further, the user interface 150 can enable the user to attach content to the web content 155, share the web content 155 with others, etc.

The plug-in module 140 allows the user to act on any web page that is currently being viewed by the user and, in one embodiment, transmits the user-created content (e.g., comments and ratings) in association with an identification of the web content to the server computer 110. After the plug-in module 140 is installed on the web browser 120 (e.g., via an installation web page that directs the user to download the plug-in module 140 for installation), the user can visit any third party web site and click a button associated with the plug-in module 140 to create user content in association with the third party web site and submit the user content to the server computer 110. The user does not have to visit the web site through the plug-in module 140 or user interface 150 but rather can navigate to the web site using the user's web browser 120. In one embodiment, the plug-in module 140 can be implemented as a built-in module of the web browser 120 (e.g., shipped by Microsoft Corporation as a built-in component of INTERNET EXPLORER®).

Thus, when a user is looking at a web page (e.g., a news article or a blog entry), and if the user is interested in acting upon it (e.g., to share it, to submit it to the server computer 110 for indexing, or to rank or comment on it), the user can click on the plug-in module button and then work on the user interface 150 that, in one embodiment, populates some of the fields automatically by automatically taking those contents (e.g., snippets) from the web content 135 (e.g., a web page) that the user is currently looking at (e.g., thumbnail image, the lead sentence, etc.). There is no need for any prior arrangement between the web page being acted upon and the plug-in module 140/server computer 110.

For example, a blog-related service may use such a plug-in module 140 to assist the blog author that blogs on news articles. When looking at the news article, the user clicks the plug-in button and the user interface 150 shows the blog template that has many fields pre-populated with content from the news article (e.g., a thumbnail icon image, a lead sentence, etc.). Thus, the user does not have to perform the copy and paste manually. The user can work on the user interface 150 to compose the remaining part of the blog entry about the news article, such as rating, comments, etc.

In one embodiment, the user interface 150 displays advertisements to the user, such as for one or more products. In one embodiment, the advertisements are transmitted to the browser 120 by the server computer 110. Alternatively, a third party advertisement server can transmit advertisements to the user interface 150 for display. In one embodiment, the advertisements may be related to the portion of the web content 155 displayed by the user interface 150. The user interface 150 can also display statistics. For example, the user interface 150 can display statistics associated with the portion of the web content 155, statistics associated with the user (e.g., number of days since the user has downloaded the plug-in module 140, amount of web content that the user has commented on, amount of web content that the user has shared, amount of web content that the user has rated or ranked, number of and/or which other users the user has followed, number of and/or which other users have followed the user, etc.), statistics about the user interface 150, statistics about the plug-in module 140, statistics about other users associated with the plug-in module 140 (e.g., the number of users who have downloaded the plug-in module 140 and/or the number of users who have downloaded the plug-in module 140 and who have currently activated the plug-in module 140 to view a corresponding user interface), and/or statistics about any other information.

In one embodiment, the user interface 150 displays advertisements that are posted by other users who have downloaded the plug-in module 140. The advertisements can be, for example, an advertisement for a roommate, an advertisement to sell or buy a product, a classified jobs section, a dating section, etc. Thus, in one embodiment, a product manager at company XYZ can post a job position that is available at XYZ to the users of the plug-in module 140. As another example, suppose one user is using his web browser 120 to search for a new television set. In one embodiment, the plug-in module 140 can detect the user's searching and post an advertisement for a TV that another user in the community (e.g., another user who has downloaded the plug-in module 140) is selling.

Figure 2A:
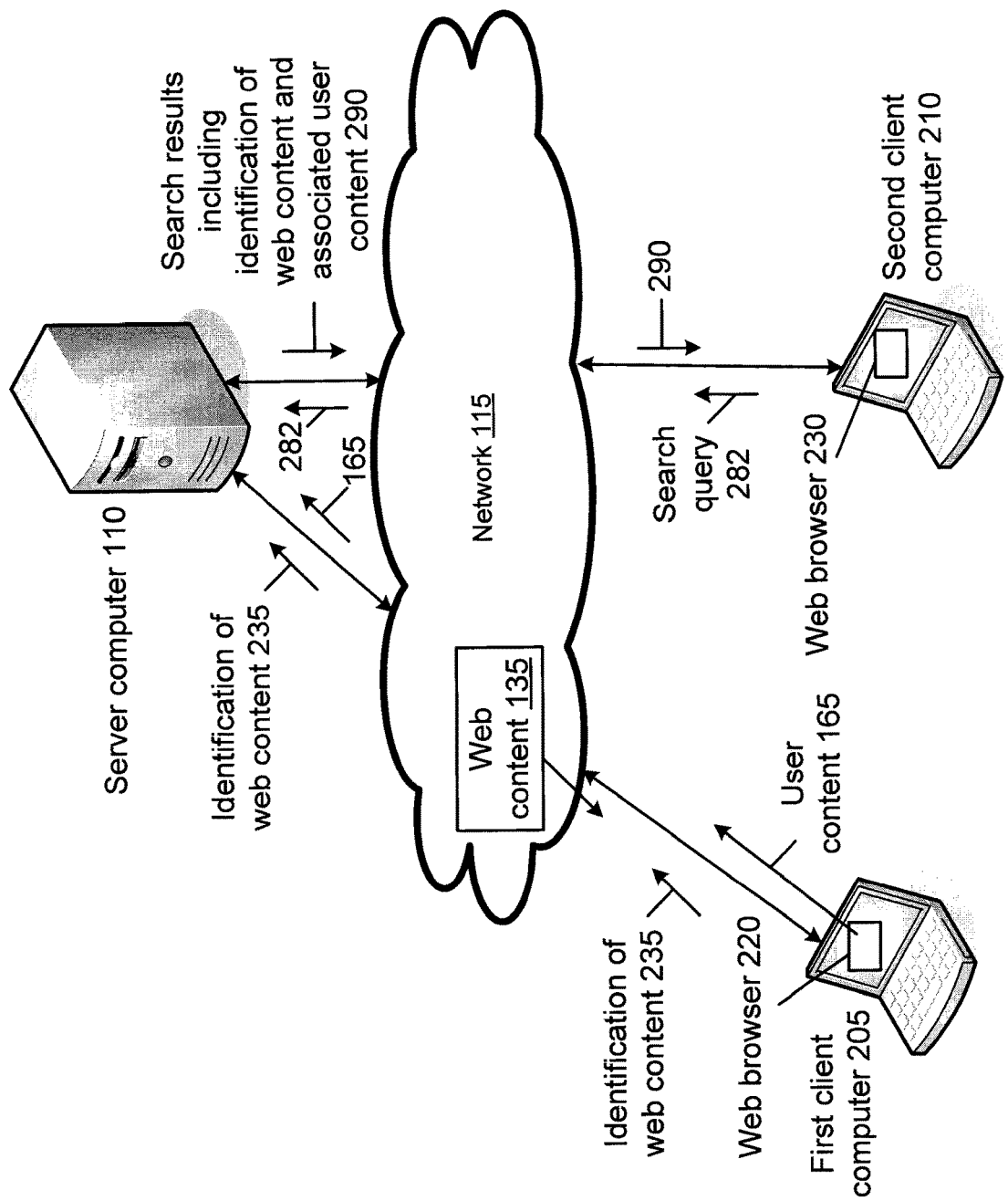
FIG. 2A is a block diagram of a first client computer and a second client computer communicating with the server computer in accordance with an embodiment of the present disclosure.
Figure 2B:
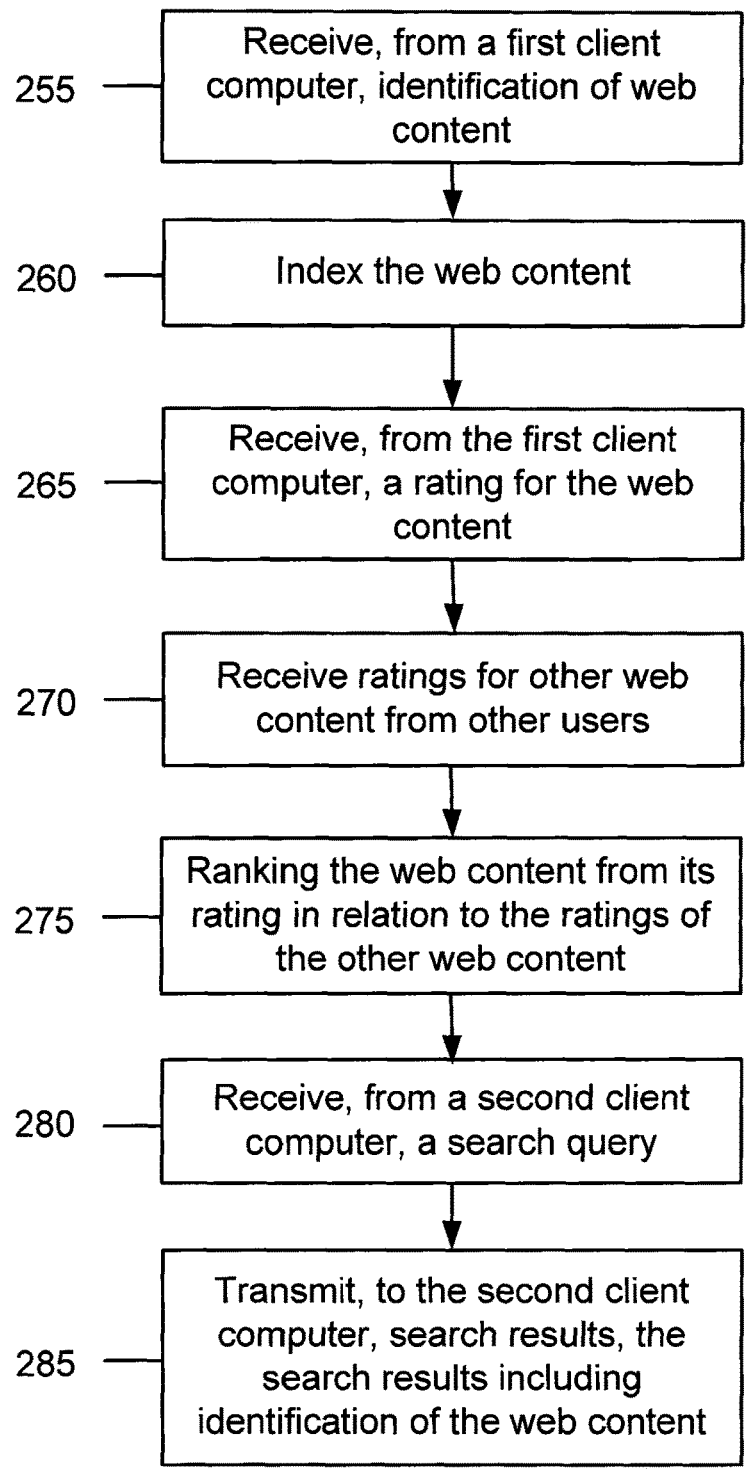
FIG. 2B is a flowchart illustrating operations performed by the server computer to enable a human powered search in accordance with an embodiment of the present disclosure.

FIG. 2A is a block diagram of an embodiment of a first client computer 205 and a second client computer 210 communicating with the server computer 110 over network 115. FIG. 2B is a flowchart of an embodiment of operations performed by the server computer 110. As described above, in one embodiment the plug-in module is transmitted to web browser 220 of the first client computer 205 and web browser 230 of the second client computer 210. Each web browser 220, 230 is displaying web content 135 as described above. In one embodiment, the user of the first client computer 205 activates the plug-in module, which in turn results in the corresponding user interface being displayed. As described above, the user of the first client computer 205 can act upon the web content displayed by the web browser 220 of the first client computer 205.

In one embodiment, the user of the first client computer 205 submits an identification of web content 235 to the server computer 110. In one embodiment, the submitting of this identification of web content 235 occurs when the user submits (via the user interface 150) a URL of the web page being displayed in the main window of the web browser 220 to the server computer 110. In one embodiment, the submitting of this identification of web content 235 occurs when the user submits user content 165 as described above, such as the user submitting a rating or ranking of the web content displayed by the web browser 220 in its main window 130, a user submitting a thumbnail version of a picture from the web content, a sentence from the web content, and/or a link to the web content. The first client computer 205 transmits the identification of web content 235 to the server computer 110.

In one embodiment, the server computer 110 receives, from the first client computer 205, the identification of web content 235 (Operation 255). The server computer 110 indexes the web content (Operation 260) for, for example, inclusion in search results. In one embodiment, the server computer 110 receives a rating for the web content from the first client computer 205 (Operation 265), such as receiving a rating that has been provided by the user in the user interface displayed by the plug-in module. The server computer 110 also receives ratings from other users for other web content displayed by other user interfaces (Operation 270). In one embodiment, if operation 260 has already been completed (i.e., the web content has already been indexed by the server computer 110, the first client computer 205 can comment on, provide ratings for, submit, etc. the web content. In one embodiment, the server computer 110 then ranks the web content from its rating in relation to the ratings of the other web content received from other users (Operation 275). In one embodiment, the user of the second client computer 210 transmits a search query 282 to the server computer 110. The server computer 210 receives the search query 282 (Operation 280) and transmits search results 290 to the second client computer 210. In one embodiment, the search results 290 include identification of web content (e.g., a link to the web content) and associated user content (Operation 285). In one embodiment, the search results 290 include web content in an order associated with the ranking and/or ratings associated with the web content received by the server computer 110. Thus, unlike other search engines, such as GOOGLE® and BING®, which use bots/web crawlers to follow links in web pages to discover content and then sort the indexed content through an algorithm, the ranking of the web content in the search results 290 is based on human input (e.g., human ratings, such as like, dislike, or neutral). Thus, the human input affects the search results in real time. In one embodiment, the more people recommend a web page, the higher it shows up on a related search.

For example, the search results may be a page similar to GOOGLE® search result, where a list of results are shown, each having a snippet of the respective web content, the aggregated user rating, links to respective web content and the user comments, etc.

In one embodiment, the human user may specify a few keywords for the content identified by the user, and the content is indexed using the human identified keywords. Human users may comment on the content, which augments the original content. In one embodiment, the user interface allows a user to search for web pages and/or user added content via tags. Search results can be presented according to categories of the content and/or sorted according to some criteria. In one embodiment, the search results 290 are displayed to the user by the plug-in module in the user interface.

Thus, the search results 290 may change in real time, as they depend off of human input (e.g., rating, recommending, tipping, commenting, sharing, adding user content such as pictures, etc.) and not on links or a web crawler.

For example, in one embodiment the web content 135 comes from NYTimes.com or CNN.com which has no relation with server computer 110. When a user is browsing a CNN.com page and finds an interesting article at CNN.com/xyz.html, shown as the web content 135 in the main window 130 of the browser 220 in a typical browsing experience, the user may click the plug-in icon to call the plug-in module 140 into action. The plug-in module 140 gets the address of the web content 135—CNN.com/xyz.html— from the browser 220. The plug-in module 140 then gets the article either from the main browser window 130, or directly from CNN web server, or sends the address back to the server computer 110 to ask the server computer 110 to get the article from CNN.com/xyz.html. The address is used to obtain a snippet of the web content 155 (e.g., a thumbnail version of a picture from the article, a sentence or two from the article, a few keywords, etc.). The snippet 155 is populated into the user interface 150 to help the user create a "blog-entry" like submission to the server computer 110 to index the article with user content 165 (e.g., user selected keywords, rating, comments). The user does not have to do a copy/paste to create the submission. Once the article is indexed in the server computer 110, other users can search to find the article and view the user content 165 and add more user content 165 (e.g., their ratings and comments).

In one embodiment, once a web page has been added into the system (e.g., indexed by the server computer 110), it has no "positive rating" or "negative rating" by default. In this state, it has zero score. In one embodiment, ratings increase the score of a webpage. For example, a positive rating increases the score of a webpage by 1; and a negative rating increases the score of a webpage by 0.2. Other scores can also be used to differentiate the positive rating and negative rating. In one embodiment, items with more score are ranked higher up on the search results 290. These scores can be adjusted to improve search accuracy. In one embodiment, if two web pages have an equal score, the server computer 110 decides which web page shows up higher based on a number of factors, such as tags, keywords, word combinations, frequency, etc. In one embodiment, by letting users control what articles they like, the server computer 110 delivers a more social search experience as well as cut down on spam.

For each web item (web content) (e.g., a web site, a video, a web page) hosted on the web/internet (typically not on the server computer 110), the server computer 110 allows its users to create user content 165, which typically includes a snippet or portion of the web content 155 (such as one or sentences from the web content 135, one or more thumbnail images of the web content 135, etc.). The snippet 155 is not generated until a user submits it to the server via the plug-in module 140. The user content 165 may further include a set of tags/keywords. The plug-in module 140 and/or the server 110 may automatically select the snippet and the tags/keywords 155 for the user, by processing the web content 135 in an automated way. The snippet and/or the tags/keywords 155 suggested by the plug-in module 140 and/or the server computer 110 may be modified by the user via the user interface 150 of the plug-in module 140. The snippet 155 is stored on the server computer 110 (as part of the user content 165 associated with the web content 135); and in one embodiment the user content 165 has a link to the web content 135, which allows the users of the server computer 110 to follow the link to see the actual/current version of the web content 135 that is on the web (typically not on the server computer 110). One or more users can add additional contents to the "user content" 165 associated with the web content 135, such as a vote/rating, and a comment. The first user submitting the snippet and/or tags/keywords can submit this information with his/her rating/vote and comment.

In one embodiment, if a second user uses the second client computer 210 that has the plug-in installed to visit the web content that has an associated user content (e.g., a snippet, a set of votes by different users and comments) in the server computer 110, the browser plug-in module shows the availability of the user content (e.g., the numbers of comments the server computer 110 stores for the web content displayed in the main window and the counts of up votes and down votes) and the second user can click on the browser plug-in module to activate a user interface to view the user content and/or provide additional user content. The second user may use a search page of the server computer and/or the user interface of the plug-in module to search, based on the tags, to discover the web content and then view the user content using the plug-in module.

Figure 3A:
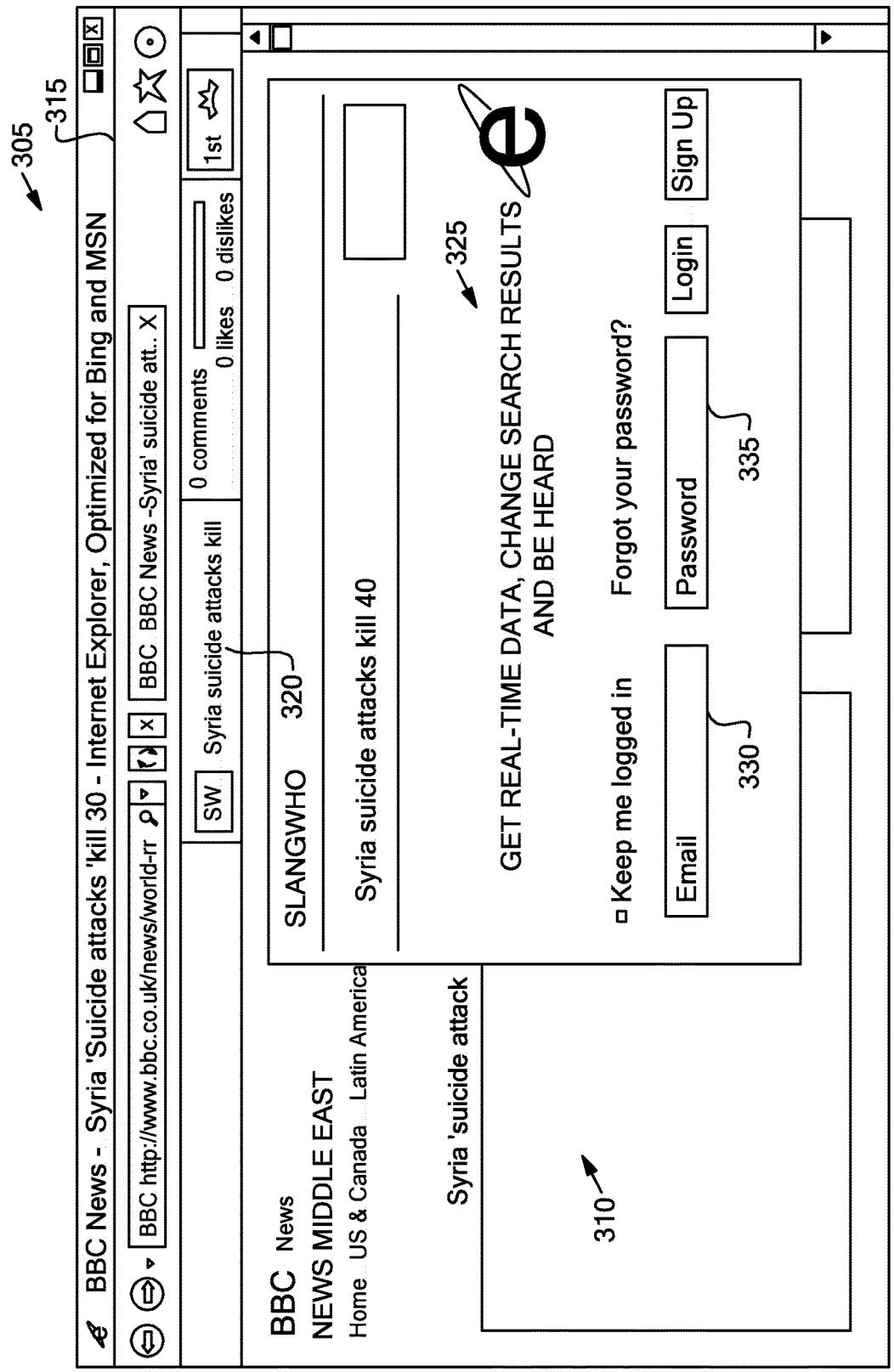
Figure 3B:
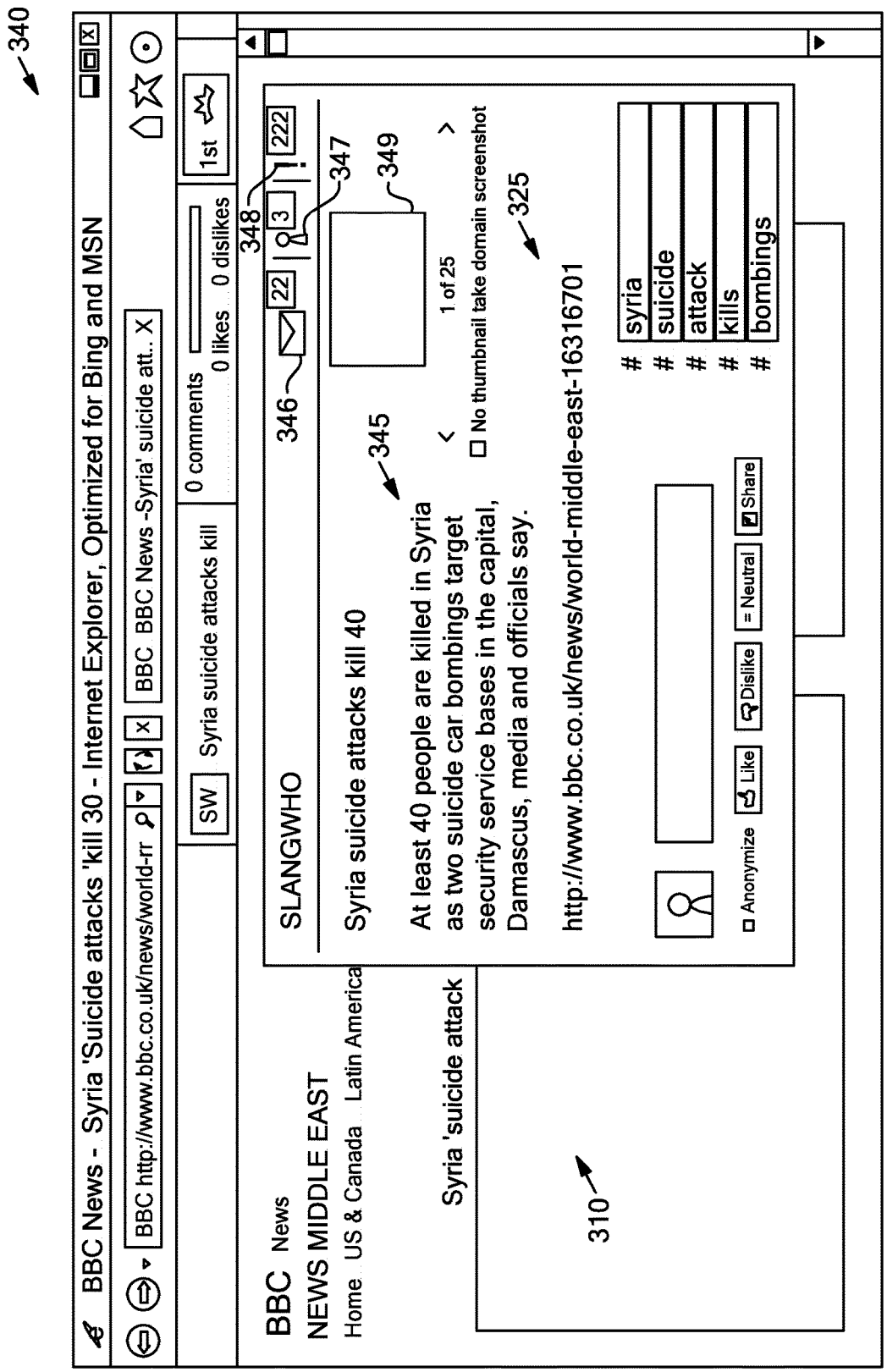
Figure 3C:
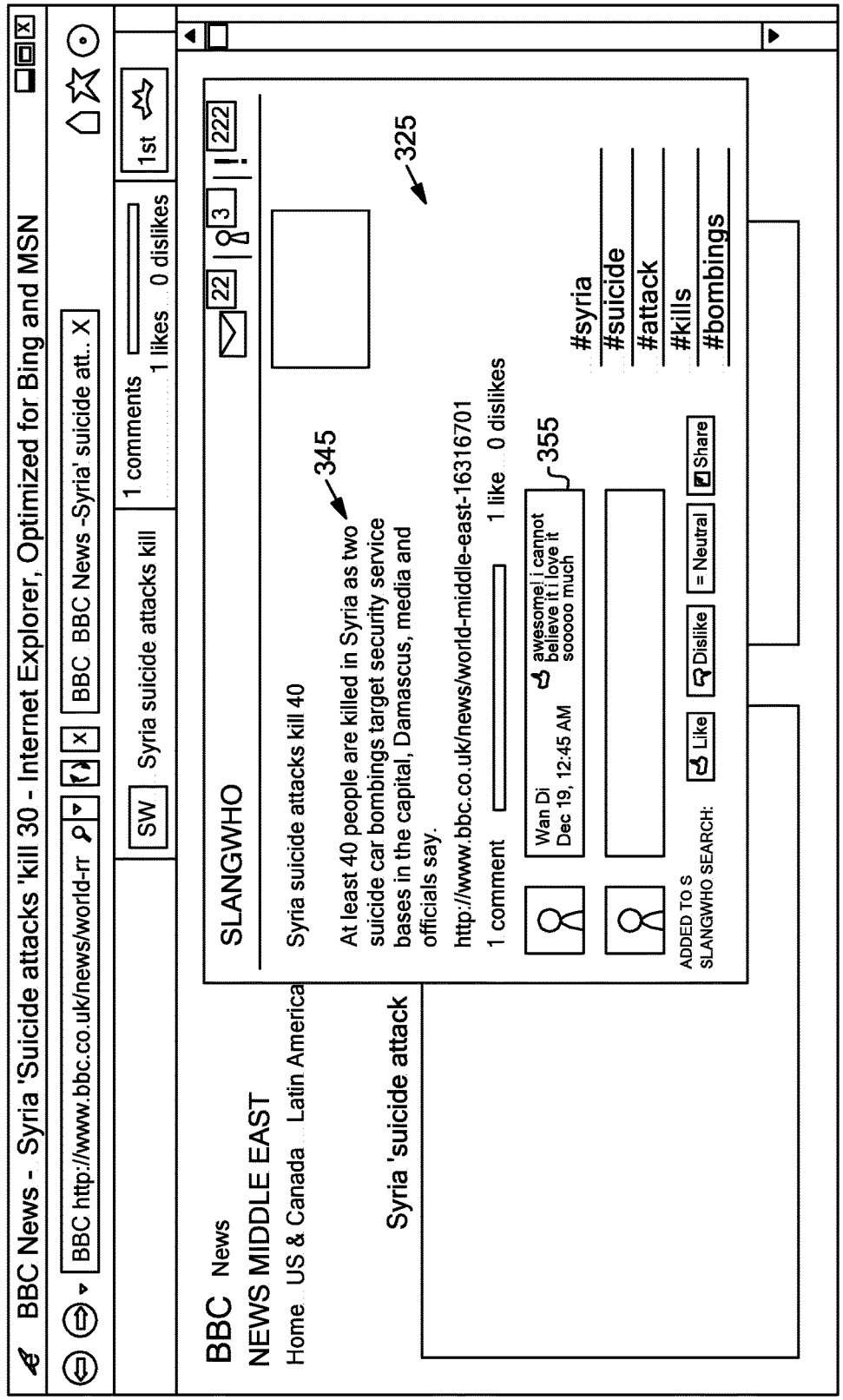
Figure 3D:
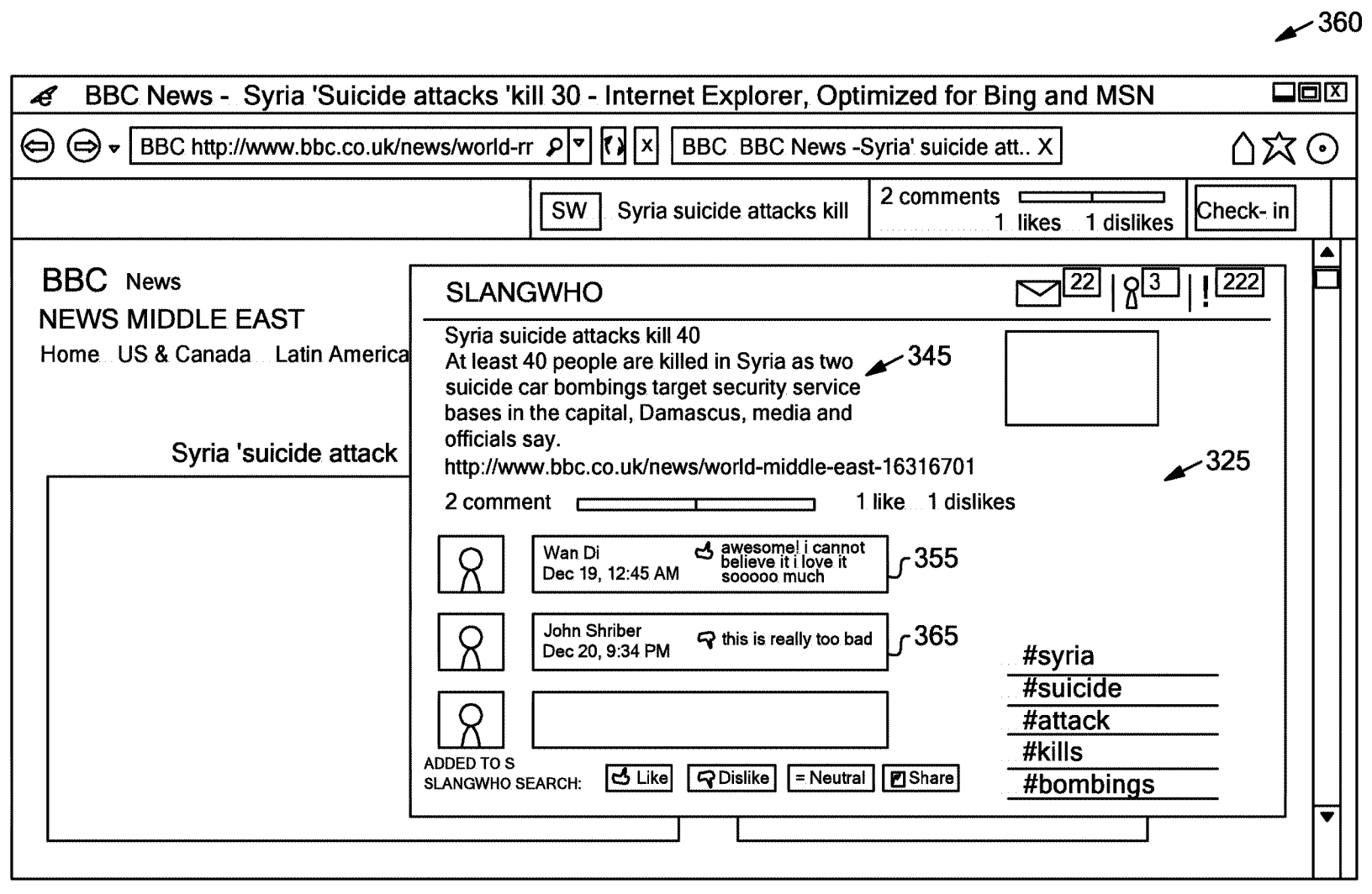
Figure 3E:
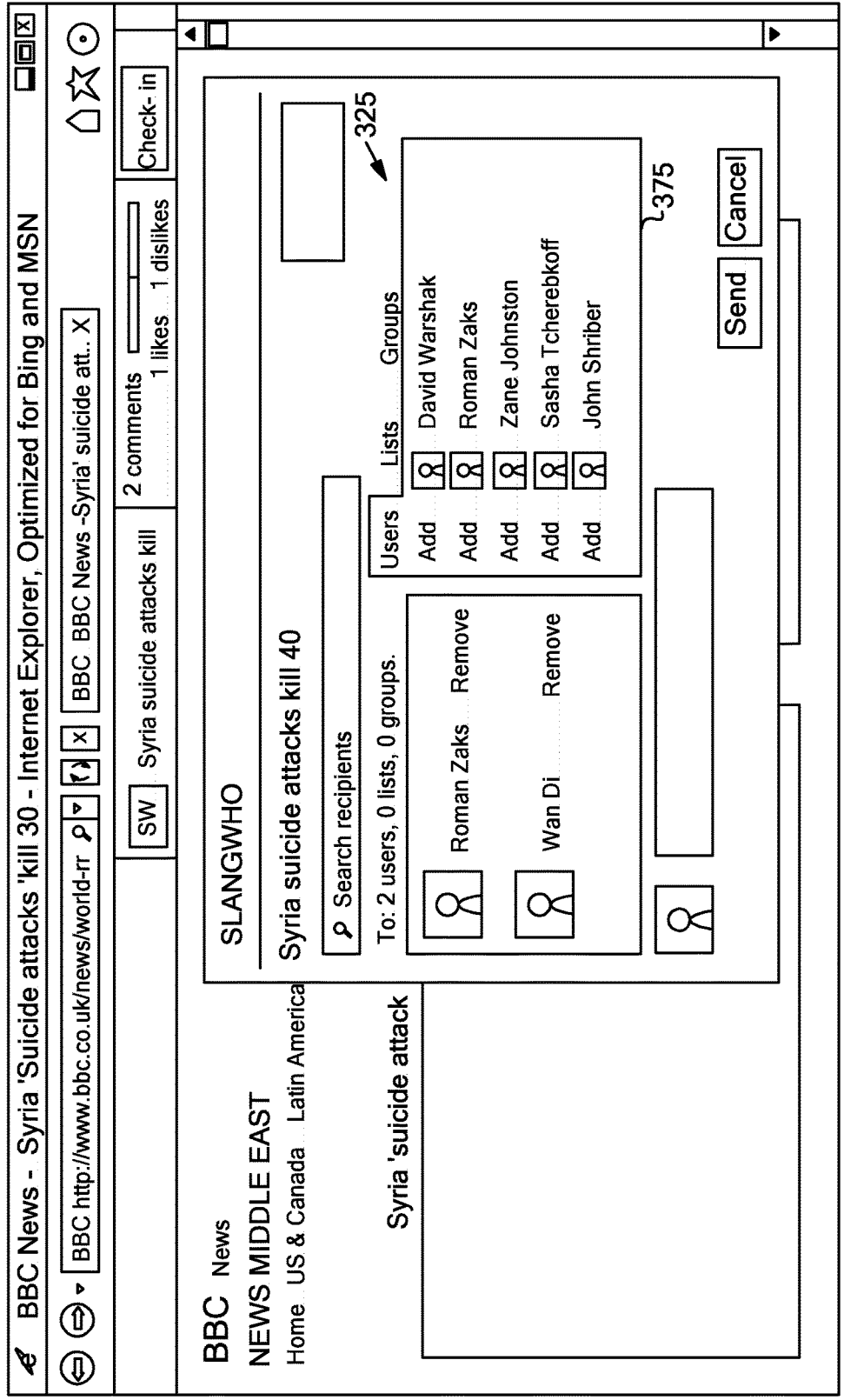
Figure 3F:
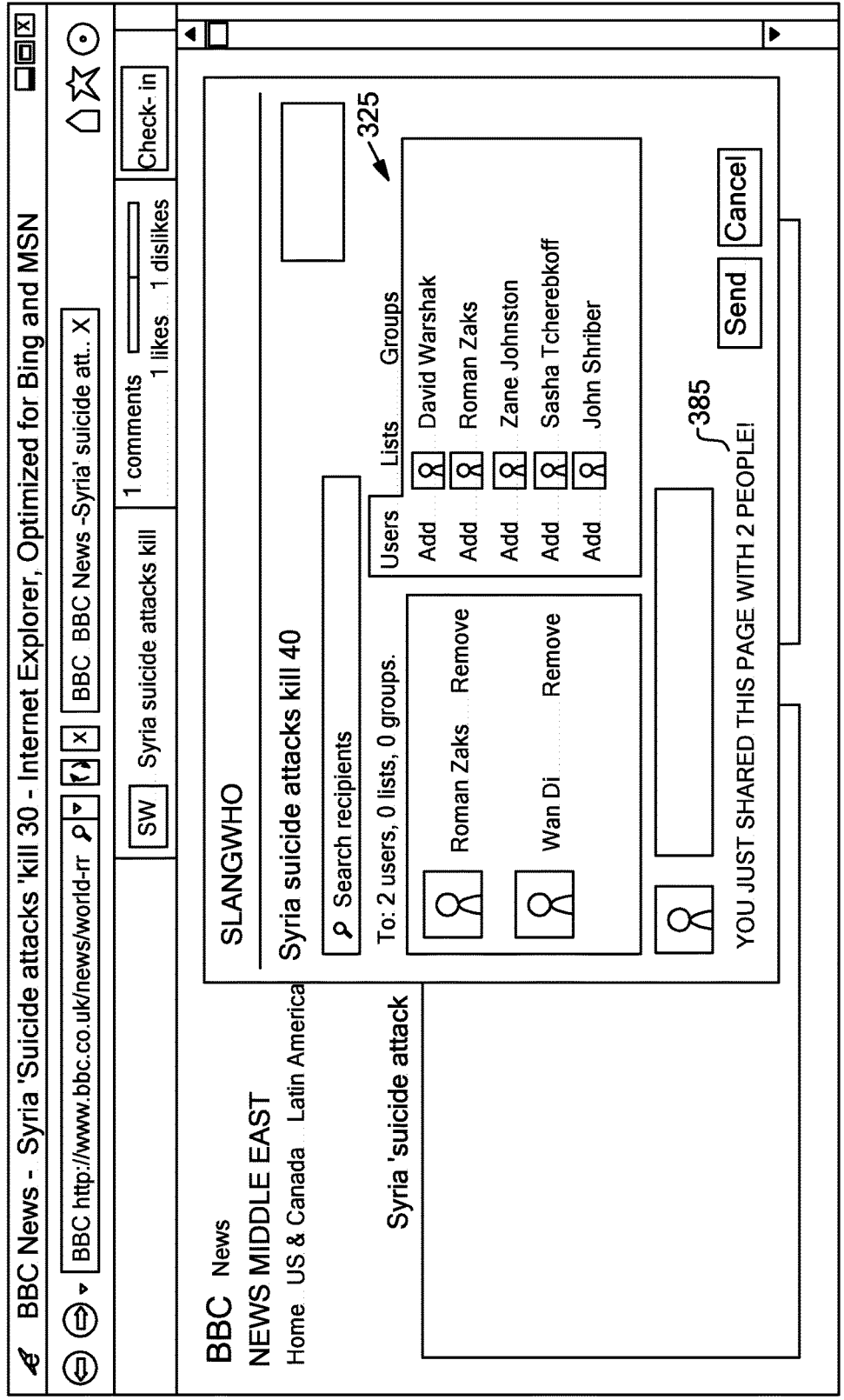

FIGS. 3A-3F are exemplary screen shots of the user interface and the plug-in module when a web page is added to the server computer 110 (e.g., added to be indexed for search results) via the plug-in module. In FIG. 3A, screen shot 305 shows web content 310 being displayed by web browser 315. The user has activated the plug-in module via plug-in module button 320, which results in user interface 325 being displayed. Screen shot 305 shows the user interface 325 enabling the user to log in via log-in input areas 330, 335. FIG. 3B shows a screen shot 340 illustrating the user interface 325 that includes a portion of the web content 345 associated with web content 310. The user in screen shot 340 can enter in a comment relating to the portion of the web content 345. FIG. 3C shows a screen shot 350 that includes user interface 325 having a comment 355 from the user about the portion of the web content 345. The user has indicated that he/she "likes" the web content 345. FIG. 3D is a screen shot 360 of user interface 325 displaying two comments, the like comment 355 and a dislike comment 365. FIG. 3E shows a screen shot 370 with user interface 325 displaying contacts 375 that the user can share the web content 345 with. FIG. 3F shows a screen shot 380 with user interface 325 indicating via notification 385 that the user has shared the web content 345 with two people.

Figure 4A:
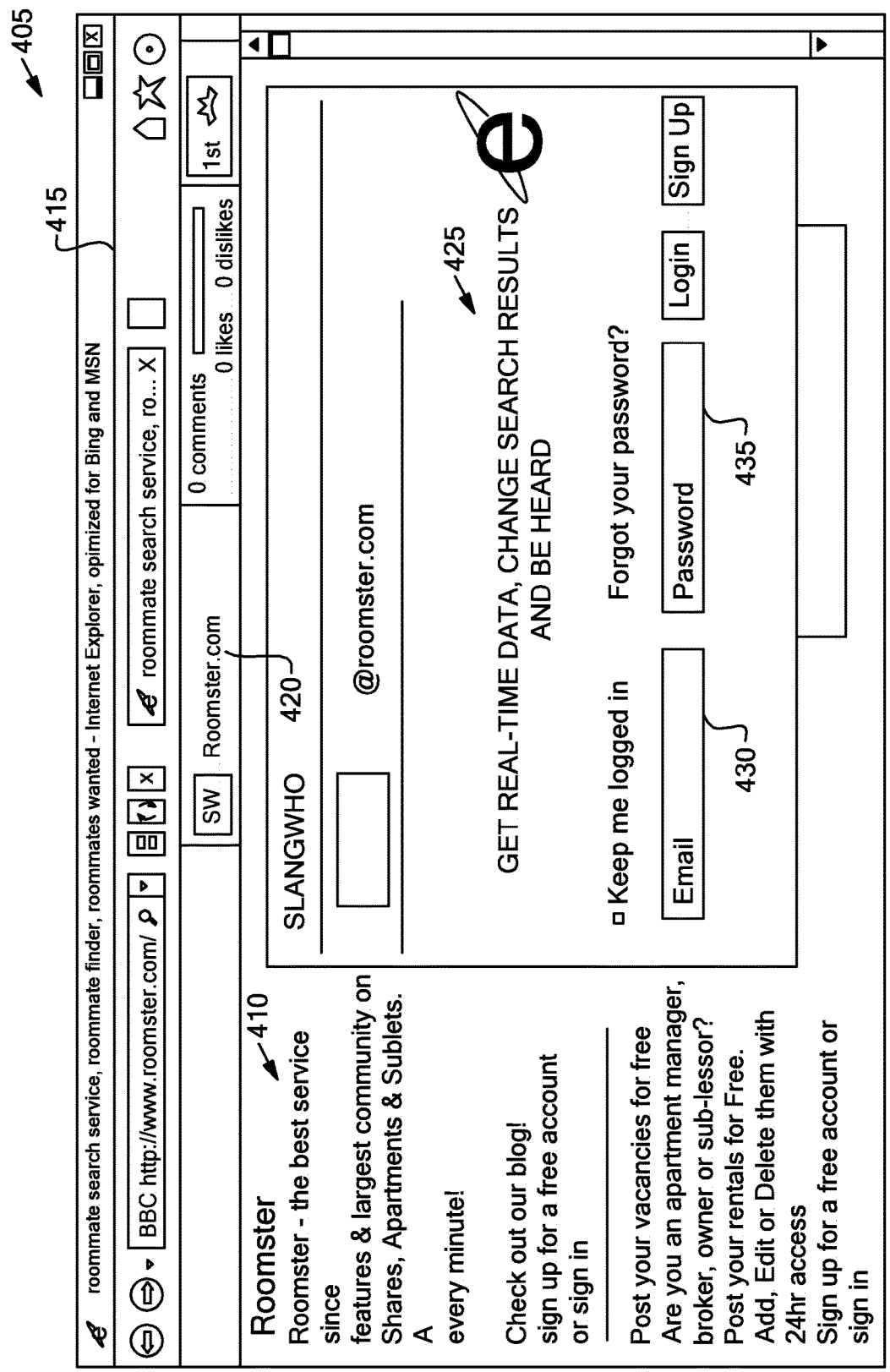
Figure 4E:
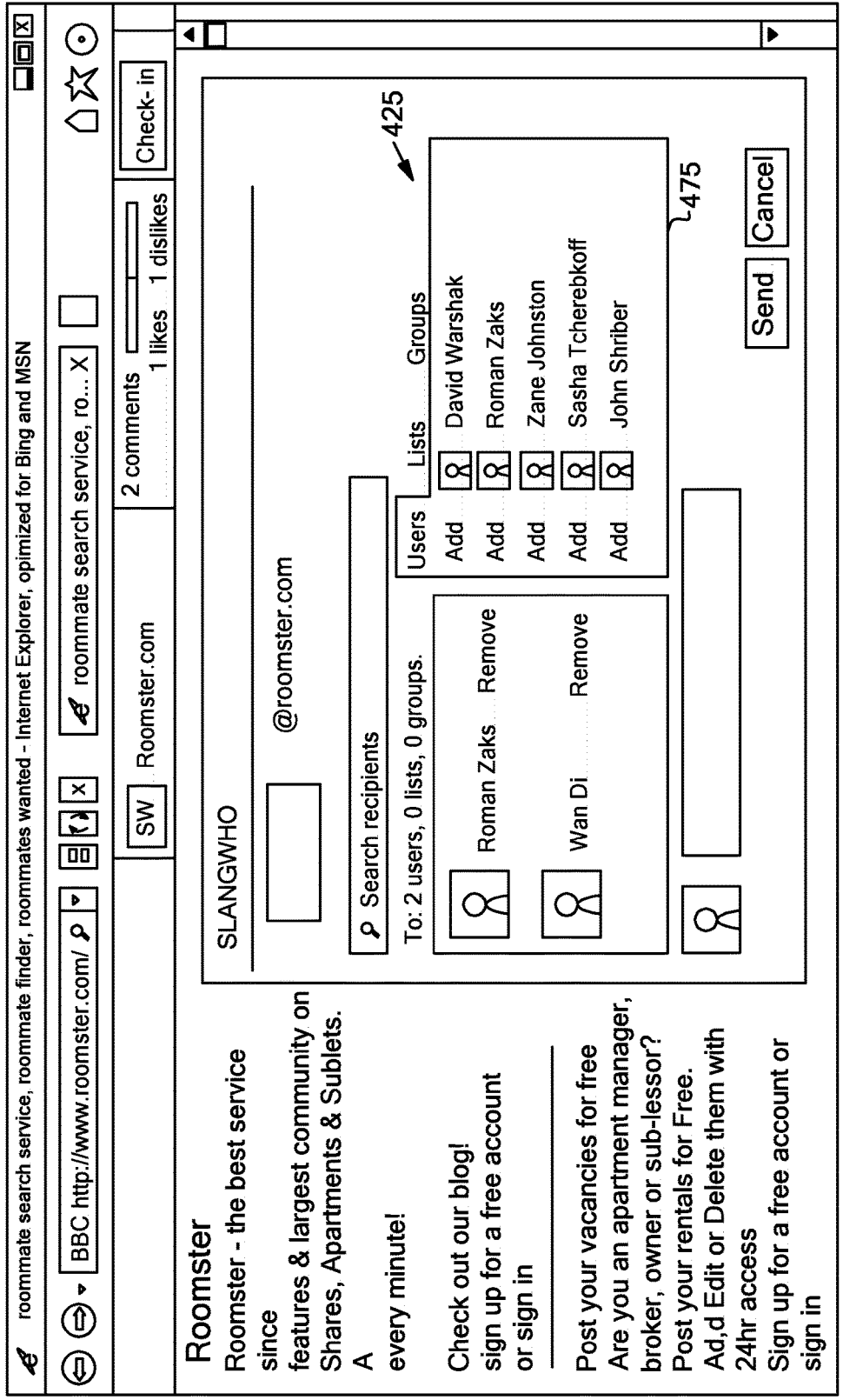
Figure 4F:
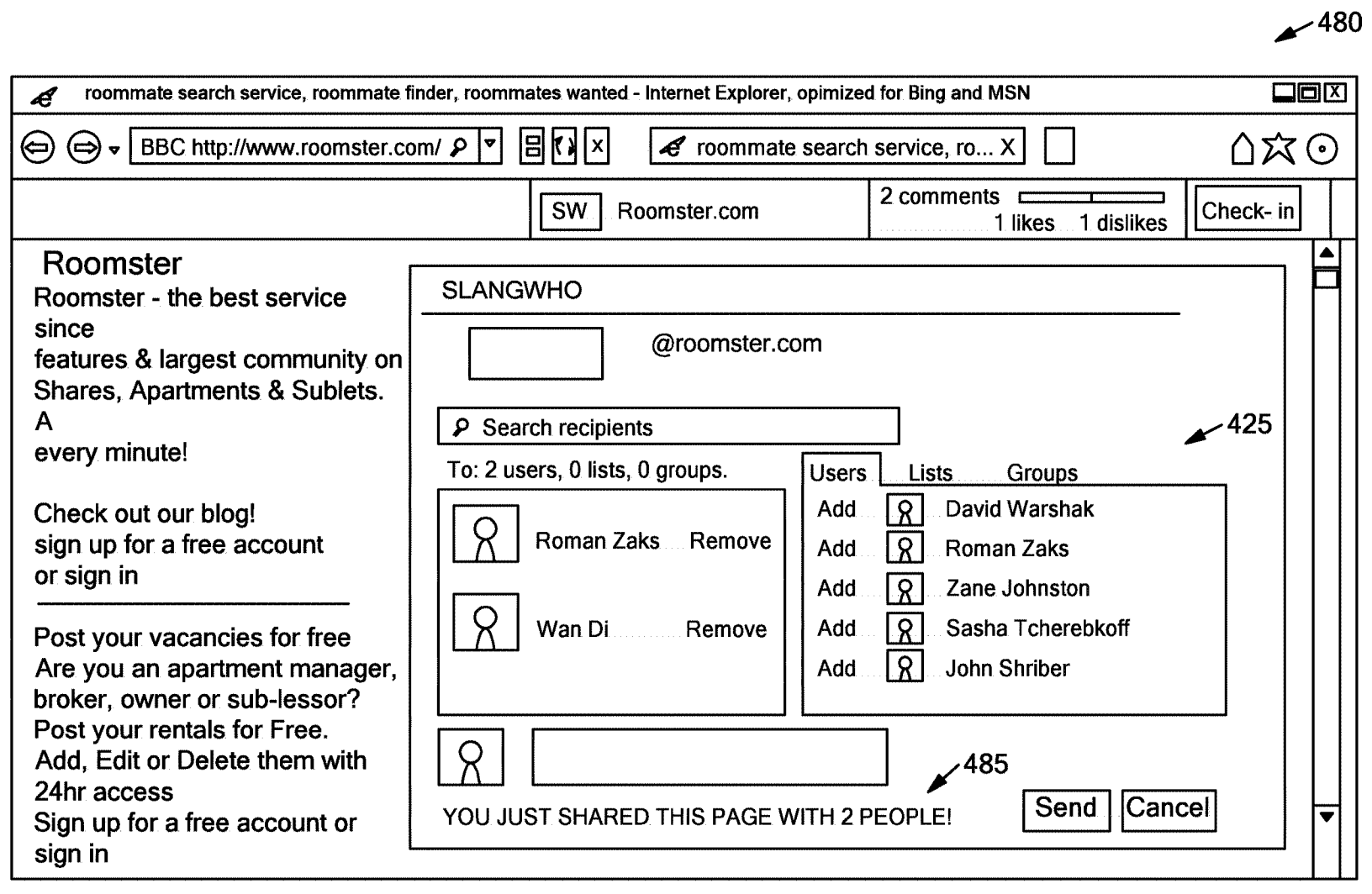

FIGS. 4A-4F are exemplary screen shots of the user interface and the plug-in module when a web site is added to the server computer 110 (e.g., added to be indexed for search results) via the plug-in module. In FIG. 4A, screen shot 405 shows web site 410 being displayed by web browser 415. The user has activated the plug-in module via plug-in module button 420, which results in user interface 425 being displayed. Screen shot 405 shows the user interface 425 enabling the user to log in via log-in input areas 430, 435. FIG. 4B shows a screen shot 440 illustrating the user interface 425 that includes a portion of the web site content 445 associated with web site 410. The user in screen shot 440 can enter in a comment relating to the portion of the web content 445. FIG. 4C shows a screen shot 450 that includes user interface 425 having a comment 455 from the user about the portion of the web site content 445. The user has indicated that he/she "likes" the web site content 445. FIG. 4D is a screen shot 460 of user interface 425 displaying two comments, the like comment 455 and a dislike comment 465. FIG. 4E shows a screen shot 470 with user interface 425 displaying contacts 475 that the user can share the web site content 445 with. FIG. 4F shows a screen shot 480 with user interface 425 indicating via notification 485 that the user has shared the web site content 445 with two people.

Figure 5:
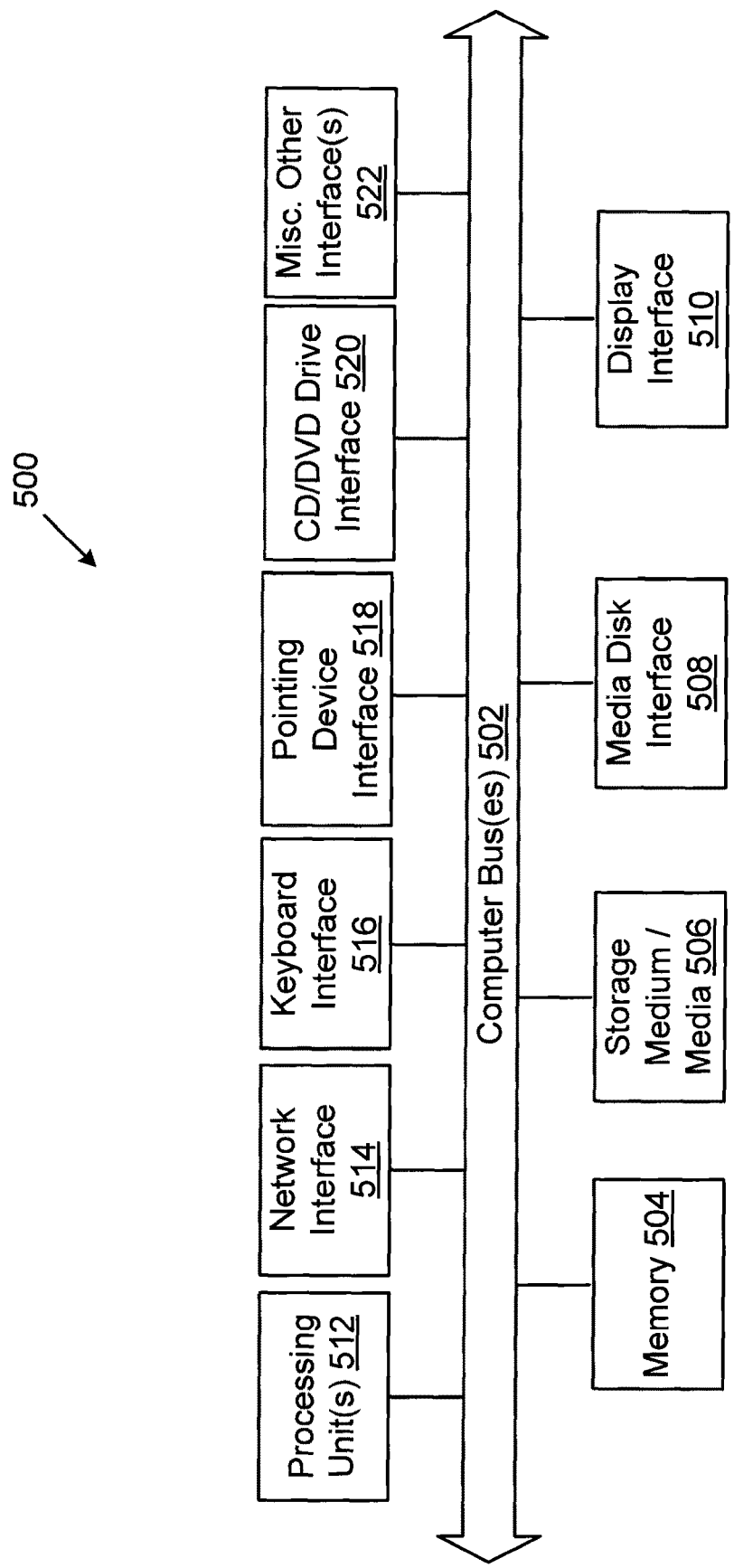
FIG. 5 is a block diagram illustrating an internal architecture of a computer in accordance with an embodiment of the present disclosure.

FIG. 5 is a block diagram illustrating an internal architecture of an example of a computer, such as server computer 110 and/or client computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 5, internal architecture 500 includes one or more processing units (also referred to herein as CPUs) 512, which interface with at least one computer bus 502. Also interfacing with computer bus 502 are persistent storage medium/media 506, network interface 514, memory 504, e.g., random access memory (RAM), run-time transient memory, read only memory (ROM), etc., media disk drive interface 508 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information stored in memory 504 to CPU 512 during execution of software programs such as an operating system, application programs, device drivers, and software modules that comprise program code, and/or computer-executable process operations, incorporating functionality described herein, e.g., one or more of process flows described herein. CPU 512 first loads computer-executable process operations from storage, e.g., memory 504, storage medium/media 506, removable media drive, and/or other storage device. CPU 512 can then execute the stored process operations in order to execute the loaded computer-executable process operations. Stored data, e.g., data stored by a storage device, can be accessed by CPU 512 during the execution of computer-executable process operations.

Persistent storage medium/media 506 is a computer readable storage medium(s) that can be used to store software and data, e.g., an operating system and one or more application programs. Persistent storage medium/media 506 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:

receiving, by a server computer from a first client computer operated by a first user, an identification of first web content displayed by a web browser of the first client computer in a main browser window, the identification of the first web content transmitted by the first user to the server computer via a user interface separate from the main browser window;

indexing, by the server computer, the first web content; and in response to receiving a search query from a web browser of a second client computer operated by a second user, transmitting, by the server computer, search results to the web browser of the second client computer, the search results comprising the first web content identified by the first user in a position relative to identifications of other web content received from other users.

2. The method of claim 1, wherein the receiving of the identification of first web content further comprises receiving, by the server computer, a rating associated with the first web content from the first user.

3. The method of claim 2, wherein the receiving of the identification of first web content further comprises receiving, by the server computer, ratings associated with the other web content from the other users.

4. The method of claim 3, further comprising ranking, by the server computer, the first web content from the rating in relation to the ratings of the other web content received from the other users.

5. The method of claim 2, wherein the rating associated with the first web content is selected from a group of rating types consisting of like, dislike, and neutral.

6. The method of claim 1, wherein the indexing of the first web content further comprises receiving, by the server computer, keywords for the first web content.

7. The method of claim 1, wherein the receiving of the identification of the first web content further comprises receiving, by the server computer from the first client computer, a comment on the first web content.

8. The method of claim 1, wherein the first web content is same as the other web content.

9. The method of claim 1, wherein the receiving of an identification of first web content further comprises receiving a rating on the first web content, wherein the rating is a score assigned by the user of the first client computer.

10. A computing device comprising:
at least one processor; and a storage medium tangibly storing thereon program logic configured to instruct the at least one processor to at least:
receive, from a first client computer operated by a first user, an identification of first web content displayed by a web browser of the first client computer in a main browser window, the identification of the first web content transmitted by the first user via a user interface separate from the main browser window;
index the first web content; and in response to receiving a search query from a web browser of a second client computer operated by a second user, transmit search results to the web browser of the second client computer, the search results comprising the first web content identified by the first user in a position relative to identifications of other web content received from other users.

11. The computing device of claim 10, wherein the program logic configured to instruct the at least one processor to receive further comprises program logic to instruct the at least one processor to receive a rating associated with the first web content from the first user.

12. The computing device of claim 10, wherein the program logic configured to instruct the at least one processor to receive further comprises program logic to instruct the at least one processor to receive ratings associated with the other web content from the other users.

13. The computing device of claim 12, further comprising program logic configured to instruct the at least one processor to rank the first web content from the rating in relation to the ratings of the other web content received from the other users.

14. The computing device of claim 11, wherein the rating associated with the first web content is selected from a group of rating types consisting of like, dislike, and neutral.

15. The computing device of claim 10, wherein program logic configured to instruct the at least one processor to index further comprises program logic configured to instruct the at least one processor to receive keywords for the first web content.

16. The computing device of claim 10, wherein the program logic configured to instruct the at least one processor to receive further comprises program logic to instruct the at least one processor to receive, from the first client computer, a comment on the first web content.

17. The computing device of claim 10, wherein the first web content is the same as the other web content.

18. The computing device of claim 10, wherein the program logic configured to instruct the at least one processor to receive further comprises program logic to instruct the at least one processor to receive a rating on the first web content, wherein the rating is a score assigned by the user of the first client computer.

19. A non-transitory computer readable storage medium storing computer program instructions configured instruct a computer processor to perform at least:
receiving, by a server computer from a first client computer operated by a first user, an identification of first web content displayed by a web browser of the first client computer in a main browser window, and a user content created by the first user of the web browser;
indexing, by the server computer, the first web content based at least in part on the user content; storing, by the server computer, the user content in association with the identification of the first web content; and
in response to receiving a search query from a web browser of a second client computer operated by a second user, transmitting, by the server computer, search results to the web browser of the second client computer, the search results comprising the identification of the first web content and the user content associated with the first web content.

20. The non-transitory computer readable storage medium of claim 19, wherein the user content including a comment on the first web content and a rating of the first web content by the first user; and wherein the user content and the identification of the first web content are composed in a user interface separate from the main browser window for transmission to the server computer, while the web content is displayed in the main browser window.

* * * * *